US011946665B2

(12) United States Patent
Massar et al.

(10) Patent No.: US 11,946,665 B2
(45) **Date of Patent: *Apr. 2, 2024**

(54) ADJUSTABLE HEAVY-DUTY BRACKET ASSEMBLY

(71) Applicant: Air Distribution Technologies IP, LLC, Milwaukee, WI (US)

(72) Inventors: Cody Massar, Lee's Summit, MO (US); Mark W. Bronson, Harrisonville, MO (US); David V. Connell, III, Paola, KS (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,097

(22) Filed: Sep. 26, 2022

(65) Prior Publication Data

US 2023/0086567 A1 Mar. 23, 2023

Related U.S. Application Data

(63) Continuation of application No. 16/811,856, filed on Mar. 6, 2020, now Pat. No. 11,454,418.

(51) Int. Cl.

| | |
|---|---|
| ***F24F 13/14*** | (2006.01) |
| ***G05G 1/08*** | (2006.01) |
| *F24F 140/40* | (2018.01) |

(52) U.S. Cl.

CPC ........... *F24F 13/1426* (2013.01); *G05G 1/08* (2013.01); *F24F 2013/1473* (2013.01); *F24F 2140/40* (2018.01)

(58) Field of Classification Search

CPC ........... F24F 13/1426; F24F 2013/1433; F24F 13/15; F24F 140/40; F24F 2013/1473; F24F 2140/40; G05G 1/08

USPC ........ 74/68, 69; 49/82.1, 86.1; 454/369, 333

See application file for complete search history.

(56) References Cited

U.S. PATENT DOCUMENTS

| | | | |
|---|---|---|---|
| 2,699,106 | A | 1/1955 | Hoyer |
| 2,718,885 | A | 9/1955 | Ericson |
| 2,766,493 | A | 10/1956 | Ferri |
| 3,973,590 | A | 8/1976 | Logsdon |
| 5,730,653 | A | 3/1998 | Van Becelaere |
| 2016/0032642 | A1 | 2/2016 | Rotchell |
| 2018/0086199 | A1 | 3/2018 | Solazzo et al. |

FOREIGN PATENT DOCUMENTS

| | | | |
|---|---|---|---|
| JP | 2004076958 | A | 3/2004 |
| JP | 2015218952 | A | 12/2015 |

*Primary Examiner* — Avinash A Savani
*Assistant Examiner* — Ryan L Faulkner
(74) *Attorney, Agent, or Firm* — Fletcher Yoder P.C.

(57) ABSTRACT

An example an adjustable bracket and a damper system usable with the adjustable bracket assembly for transmitting an actuation force from an actuator to a plurality of damper assemblies. The adjustable bracket assembly may include a shaft extending along and configured to rotate about a first axis in response to an output from the actuator, a first output lever configured to transmit a rotational force of the shaft to a first damper assembly, and a second output lever configured to transmit the rotational force of the shaft to a second damper assembly.

20 Claims, 4 Drawing Sheets

ADJUSTABLE HEAVY-DUTY BRACKET ASSEMBLY

CROSS REFERENCE TO RELATED APPLICATIONS

This is a continuation application of U.S. patent application Ser. No. 16/811,856, entitled "ADJUSTABLE HEAVY-DUTY BRACKET ASSEMBLY," filed Mar. 6, 2020, which is hereby incorporated by reference in its entirety for all purposes.

TECHNICAL FIELD

The described aspects relate to an adjustable bracket assembly usable with a heating venting and air conditioning (HVAC), and more particularly an adjustable bracket assembly for adjusting the position of a series of dampers within an HVAC system.

BACKGROUND

Heating venting and air conditioning (HVAC) and/or venting systems and other venting systems may require for controlling airflow within ducting of the system. A damper system generally includes a blocking mechanism (e.g., pivoting blades connected to an electric, pneumatic, and/or hydraulic actuator) that are capable of opening and closing the passage within a duct. However, packaging and/or retrofitting of the electric, pneumatic, and/or hydraulic actuator system and associated linkages may pose challenges due to space and efficiency concerns, especially when retrofitting damper systems to existing ducts or wall/floor openings. Thus, improvements in damper systems and damper actuator systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes an adjustable bracket assembly for transmitting an actuation force from an actuator to a plurality of damper assemblies. The adjustable bracket assembly may include a shaft extending along and configured to rotate about a first axis in response to an output from the actuator, a first output lever configured to transmit a rotational force of the shaft to a first damper assembly, and a second output lever configured to transmit the rotational force of the shaft to a second damper assembly.

Another example implementation includes a damper system for selectively controlling airflow in a first duct and a second duct. The damper system may include a first damper assembly with a first damper, wherein the first damper assembly is configured to be mounted in-line with the first duct, a second damper assembly with a second damper, wherein the second damper assembly is configured to be mounted in-line with the second duct, and an actuator for controlling a position of the first damper and the second damper via an adjustable bracket assembly. The adjustable bracket assembly may include a shaft extending along and configured to rotate about a first axis in response to an output from the actuator, a first output lever configured to transmit a rotational force of the shaft to a first damper assembly, and a second output lever configured to transmit the rotational force of the shaft to a second damper assembly.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features believed to be characteristic of aspects of the disclosure are set forth in the appended claims. In the description that follows, like parts are marked throughout the specification and drawings with the same numerals. The drawing figures are not necessarily drawn to scale and certain figures may be shown in exaggerated or generalized form in the interest of clarity and conciseness. The disclosure itself, however, as well as a preferred mode of use and further advantages thereof, will be best understood by reference to the following detailed description of illustrative aspects of the disclosure when read in conjunction with the accompanying drawings, wherein:

DETAILED DESCRIPTION

Figure 1:
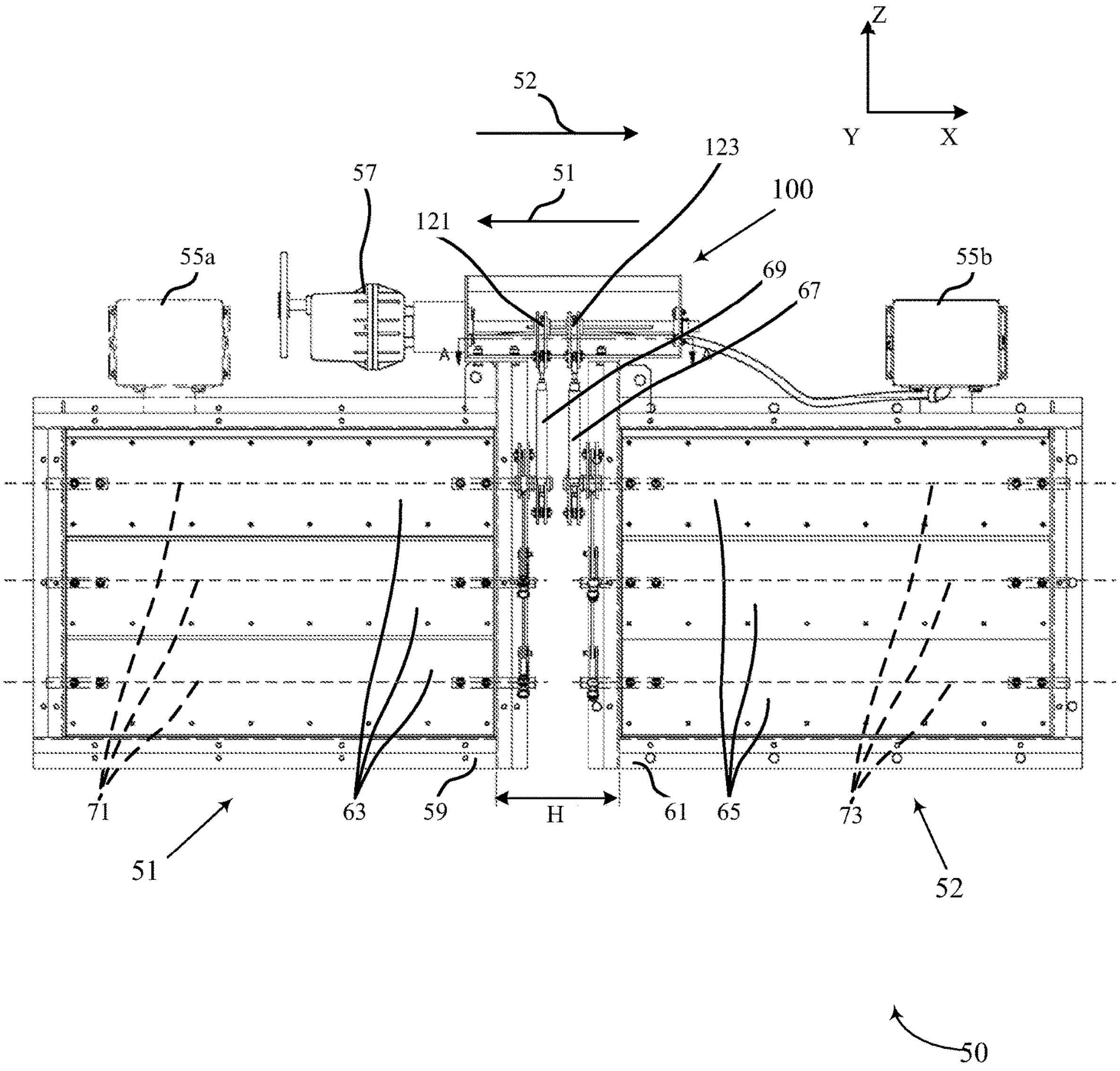
FIG. 1 is a front view of an example damper system according to the described aspects of the present disclosure.

Aspects of the present disclosure relate to an adjustable bracket assembly that improves ease of installation of a damper system in both new HVAC and/or venting systems or when a damper system is retrofitted to existing HVAC and/or venting ducts.

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details.

For purposes of the disclosure, directional terms are expressed generally with relation to a standard frame of reference when the system and apparatus described herein is installed and in an in-use orientation.

Throughout the disclosure, the term substantially may be used as a modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of skill in the relevant art.

Throughout the disclosure, the term duct may be used in conjunction with HVAC systems and in conjunction with example implementations of the disclosure. As one example, a duct may include any passage, opening, or conduit and may configured the have fluids such as air, liquid, or gasses passed therethrough. It is noted that the term duct is not limited to a conduit associated with an HVAC system and may include any opening or passage in a wall, ceiling, floor, and/or door, to name a few examples. The aforementioned examples are not intended to be limiting.

Aspects of the current disclosure are usable with any HVAC system, venting system, dynamic or static fire and smoke damper, which may include some type of blocking mechanism (e.g., pivoting blades connected to an electric, pneumatic, and/or hydraulic actuator) that is capable of opening and closing the passage within a duct. In one example, the aspects of the current disclosure are usable with a venting system for providing ventilation to enclosed or underground facilities or tunnels. It is noted that throughout the disclosure the terms, blocking mechanism, blocking device, blade, or damper system may be used interchangeably and may include any device or structure that may be movable between open and closed positions and/or otherwise is configured control the flow of air or other gasses through ductwork.

Figure 2:
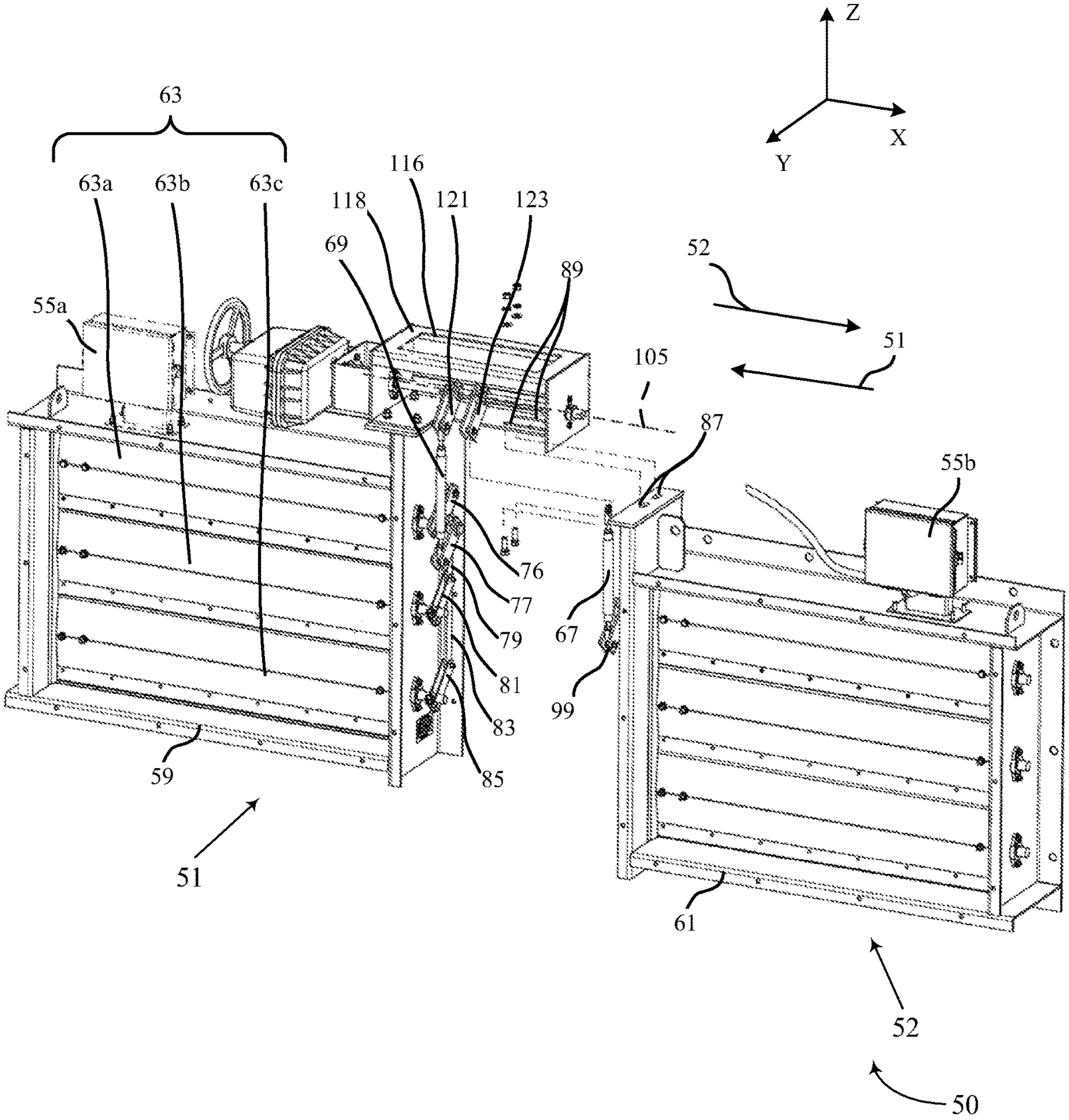
FIG. 2 is a partially exploded perspective view of the example damper system of FIG. 1 according to the described aspects of the present disclosure.

For context, a general overview of an implemented damper system and bracket assembly usable with the current disclosure is provided below. The following serves as a broad overview of the current disclosure and the problems the disclosed concepts aim to solve. When installing ductwork and damper assemblies in a facility and/or retrofitting damper assemblies to existing ductwork, space requirements may partially dictate the location of the ductwork. Thus, when damper systems are specified for a duct or series of ducts variances may exist that would pose challenges when a traditional damper system is installed in a facility. For example, with reference to FIG. 1, a series damper assemblies 51 and 52 may be installed in-line with ducts (not shown) that extend along the Y direction (see FIG. 2). In some cases, the aforementioned series of ducts may run substantially parallel or may include a section that runs parallel or substantially parallel. In addition, it may be desirable to use a single motor or actuator, e.g. 57, to control the both sets of damper assemblies, e.g., 51 and 52. However, dimensions between venting ducts may vary which caused difficulty in the past when retrofitting a system to current venting ducts or when installing a new venting system. When installing the series of damper assemblies 51 and 52 in-line with the aforementioned ducts, a distance H may vary. Thus, the current disclosure provides a damper assembly and/or adjustable bracket assembly that allows for the damper assemblies to be installed properly when distance H varies between two ducts, for example. In addition, the features described below also allow for variances in the aforementioned ducts in the Z direction and/or may be adaptable to compensate ducts that are skewed, i.e., that do not run parallel one another, to name a few additional examples. It is noted that while certain features are described with relation to and elements of the current disclosure may be usable with a series of dampers as shown in FIGS. 1 and 2, the disclosure is not limited to the specific figures or description provided under this general overview. For example, aspects of the disclosure system may also be usable with three or more series of dampers as well, to name one additional example. Further detail of aspects of the disclosure are described with reference to the drawings below. The following overview is intended merely to provide context and is not intended to limit the breadth of the disclosure or claims in any way.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Further, in some cases, methods, procedures, and components that are well-known or methods that would have been understood by one of skill in the art are described generally and without specific so as to not unnecessarily obscure aspects of the present disclosure.

Referring to FIG. 1, the damper system 50 may include a first damper assembly 51 and second damper assembly 52. The first damper assembly 51 may include a series of rotatable blades 63 configured to rotate about respective axis 71 and configured to move from an open position (not shown) so that flow through the passage of the first damper assembly frame 59 is not impeded or minimally impeded by blades 63 to a closed position (as shown in FIGS. 1 and 2) closing or substantially closing a passage within the first damper assembly frame 55 and thus limiting the flow of fluid, e.g., air, within the ductwork of an HVAC or venting system. Similarly, the second damper assembly 52 may include a series of rotatable blades 65 configured to rotate about respective axis 73 and configured to move from an open position (not shown) so that flow through the passage of the second damper assembly frame 61 is not impeded or minimally impeded to a closed position (shown in FIGS. 1 and 2) closing or substantially closing a passage within the second damper assembly frame 61 and thus limiting the flow of fluid, e.g., air, within the ductwork of an HVAC or venting system.

The damper position (e.g., opening and closing of blades 63 and 65) of the first damper assembly 51 and second damper assembly 52 may be controlled by a single actuator 57. The actuator 57 may be controlled via a control box 55*b*, which may be mounted to the second damper assembly 52 or alternative to the second damper assembly 51. The control box 55*b* may include any type of controller for controlling the rotational position of actuator 57. The actuator 57 may be mounted to an adjustable bracket assembly 100, which is described in further detail with relation to FIGS. 3 and 4 below. The adjustable bracket assembly 100 may transmit a rotational force provided by the actuator 57 to a first damper assembly connection link 69 and a second damper assembly connection link 67.

The first damper assembly connection link 69 and/or second damper assembly connection link 67 may include a through hole or "eye" at each end of the connection link, which may be interchangeably referred to as a first eye and second eye of each respective connection link. In addition, an eye-to-eye distance of the connection link may be adjustable using any known means in the art. In one example, a first eye and second eye of either one of or both of the first damper assembly connection link 69 and second damper assembly connection link 67 may be configured to be threaded into an elongated body of each respective connection link. Thus, each eye of the connection link may be rotated to adjust the eye-to-eye length of the link. Each threaded eye may further include a jamb nut which can be tightened against an end of the elongated body once an eye-to-eye length of the link is set to fix the eye-to-eye length of the link.

In the Example in FIGS. 1 and 2, each of the first damper assembly 51 and second damper assembly 52 include a respective first series of three blades 63 and second series of three blades 65. In the example shown in FIGS. 1 and 2, each one of the first series of three blades 63 and the second series of three blades 65 may be rotatably supported and configured to rotate about a respective first series of axis 71 and second series of axis 73. Thus, each one of the first series of three blades 63 and second serious of three blades 65 is rotatable from a substantially open position (not shown) to a substantially closed or closed position, e.g., as shown in FIGS. 1 and 2. To control the rotational position of each of blades 63 and 65, the first damper assembly connection link 69 and second damper assembly connection link 67 may transmit a rotational force to the corresponding first series of three blades 63 and second series of three blades 65 via damper levers connected to a shaft along the rotational axis 71 and/or 73 at one end of each of blades 63 and 65. For example, as shown in FIG. 1, the first damper assembly 51 may include a first damper assembly first damper lever 77 connected to a shaft at the end of a first blade 63*a*, a second damper lever 81 connected to a shaft at the end of the second blade 63*b*, and a third damper lever 85 connected to a shaft at the end of the third blade 63*c*. The first damper lever 77 may be connected to the second damper lever 81 via a first damper transfer lever 76 and a first connection link 79. Similarly, the second damper lever 81 may be connected to the third damper lever 85 via a second connector link 83. The aforementioned structure allows the first blade 63*a*, second blade 63*b*, and third blade 63*c* to rotate simultaneously when a rotational force is imparted by the first damper assembly connection link 69 to the first damper lever 77.

While not shown in FIG. 2, a similar or identical structure as described above with may be implemented in the second damper assembly 52. Thus blades 65 (FIG. 1) may also rotate simultaneously when a rotational force is imparted by the first damper assembly connection link 69 to a second damper assembly first damper lever 99 of the second damper assembly 52. While the aforementioned structure and FIGS. 1 and 2 show one example of a mechanisms usable to move blades 63 and 65 of the first damper assembly 51 and second damper assembly 52 respectively. It is noted that the aforementioned structure is not intended to be limiting and any known mechanism for opening and/or closing a series of dampers may be implemented and may be useable with the current disclosure.

Figure 3:
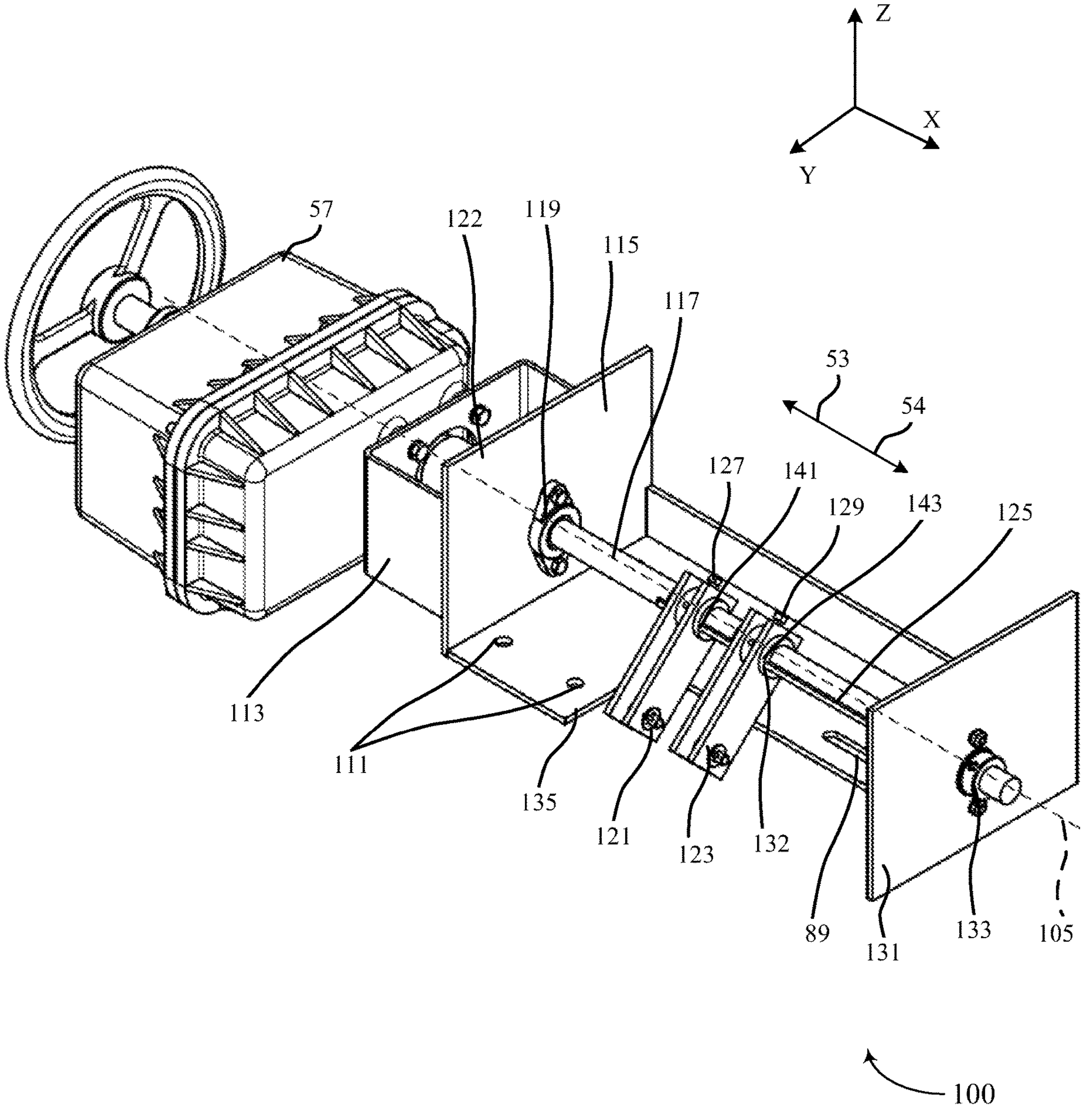
FIG. 3 is a perspective view of the adjustable bracket assembly of FIGS. 1-2 in a first configuration according to the described aspects of the present disclosure.
Figure 4:
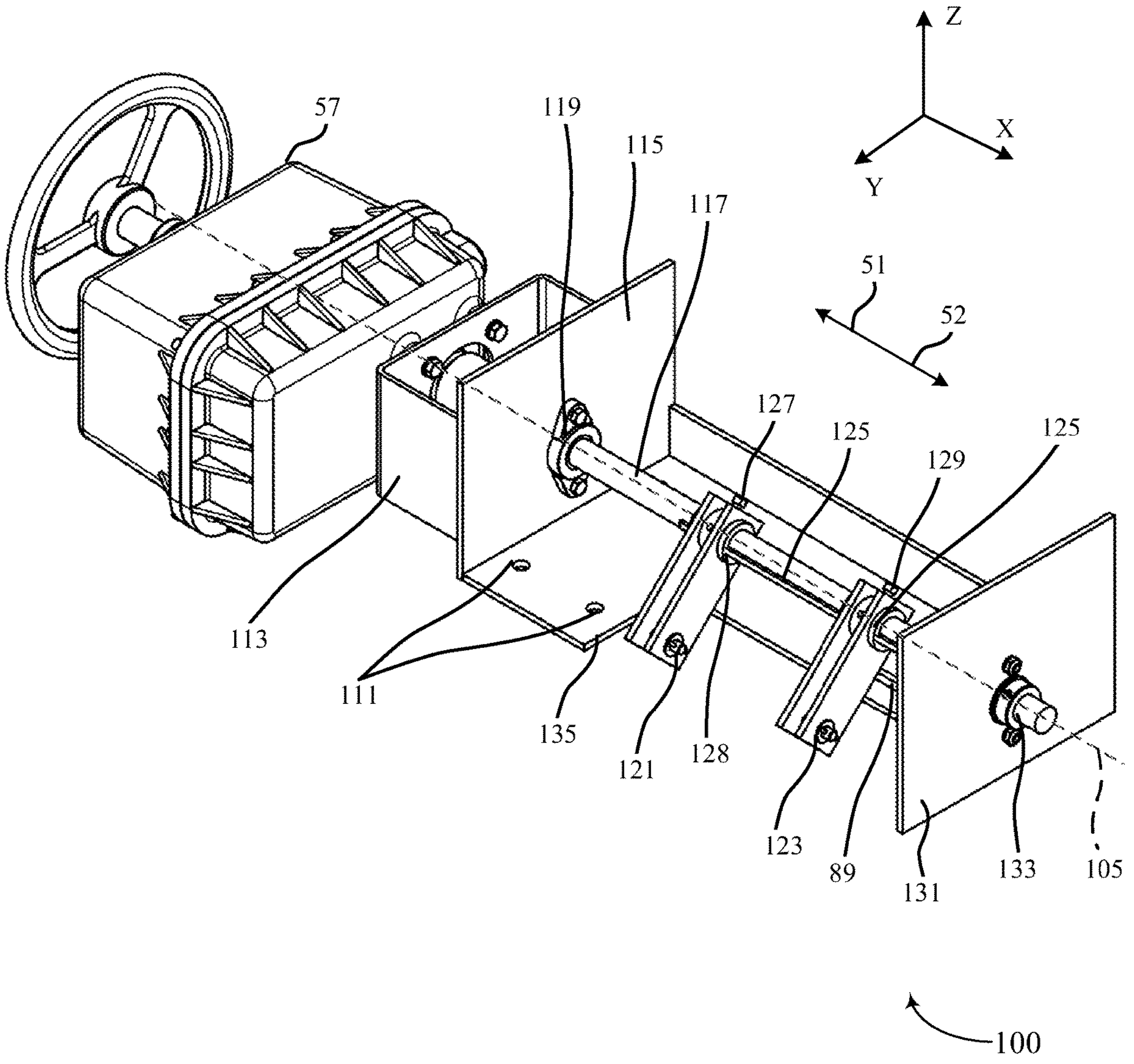
FIG. 4 is a perspective view of the adjustable bracket assembly of FIGS. 1-3 in a second configuration according to the described aspects of the present disclosure.

The first damper assembly connection link 69 may be connected to a first output lever 121 and the second damper assembly connection link 67 may be connected to a second output lever 123 of the adjustable bracket assembly 100. FIGS. 3 and 4 show one example of bracket assembly 100 shown in FIGS. 1 and 2 with top channel 116 removed for clarity. The adjustable bracket assembly 100 may include an outer housing comprising a first side wall 115, and a second side wall 131 that may be substantially parallel. The first side wall 115 and second side wall 131 may be connected via a bottom wall 135.

The bottom wall 135 may include one or more mounting provisions for mounting the bottom wall 135 of bracket assembly 100 to the first damper assembly 51 and/or the second damper assembly 52. In one example, the mounting provisions may include a first set of one or more openings or through-holes 111 (FIGS. 3-4) configured to receive fasteners (unlabeled in FIGS. 1 and 2 and not shown in FIGS. 2 and 3) to connect the bottom wall 135 and bracket assembly 100 to the first damper assembly 51. The aforementioned fasteners may be any known fastener in the art and may include but are not limited to a nut and bolt, a self-tapping screw and/or screw for installation into a threaded hole on either of the damper assembly frames 59 and/or 61 or the bracket assembly and/or a rivet or series of rivets, to name a few examples. The bracket assembly 100 and aforementioned components of the bracket assembly may be formed of any one or a combination of a known steel, aluminum, and/or composite. For example, the first side wall 115, second side wall 131, bottom wall 135, top wall 118 and/or actuator mounting portion 113 may be formed of an aluminum or aluminum alloy, a steel or steel alloy such as stainless steel, to name a few examples. The aforementioned walls may be joined using known methods such as welding, gluing, brazing, and/or via the use of fasteners such as screws, nuts and bolts, and/or rivets.

The bottom wall 135 may further include a second set of one or more openings or through-holes 89 configured to receive fasteners there through for mounting the bracket assembly 100 to second damper assembly 52 via second damper assembly mounting points 87 (FIG. 2). In one example, the second set of one or more openings or through-holes 89 may be slots allowing for adjustable mounting of the bracket assembly 100. Thus, the second set of openings 89 may allow the bracket assembly 100 to be adjustably connected to the first damper assembly 51 and the second damper assembly 52 when a distance H (FIG. 1) between the first damper assembly 51 and the second damper assembly 52 varies during installation. For example, when the aforementioned arrangement allows for a technician or installer to securably connect the bracket assembly 100 when the first damper assembly 51 and second damper assembly are mounted to a corresponding first duct (not shown) and second duct (not shown) that are spaced a first distance apart, e.g., distance H in FIG. 1, and/or when the first damper assembly 51 and the second damper assembly are mounted to a corresponding third duct (not shown) and fourth duct (not shown) that are spaced apart a second distance that is different from the first distance. Accordingly, the aforementioned mounting configuration allows that bracket assembly to be adapted to different vent configurations.

In addition to the adjustability of the mounting provisions of bracket assembly 100 discussed above, the bracket assembly 100 may further include two adjustable outputs (e.g., for controlling the positions of blades 63 and 65) from a single rotational input (e.g., from actuator 57) as described in further detail below.

As noted above, the first side wall 115 and second side wall 131 may also be connected via a top wall 118 (FIG. 2), which includes a top channel 116 (FIG. 2), which may be an opening allowing a technician or other user access to the first output lever 121 and/or second output lever 123. Thus, the first side wall 115 and the second side wall 131 may be configured to rotatably support an input shaft 117 and thus may be interchangeably referred to as a shaft support portion. The input shaft, which may be interchangeably referred to as a shaft, 117 may be an elongated shaft that extends along and is configured to rotate about a first axis 105. In one aspect, the first side wall 115 may have a bearing or bushing 119 mounted thereto for rotatably supporting the input shaft 117. While hidden from view in FIGS. 3 and 4, the second side wall 131 may include a similar bearing or bushing configured to rotatably support an end portion 133 of the input shaft 117. The bracket assembly 100 may further include an actuator mounting portion 113 for mounting actuator 57 to the bracket assembly 100.

As such, the first side wall 115 and/or bearing/bushing 119, as well as the second side wall 131 and its bearing/bushing, may define respective input shaft support portions. Correspondingly, the bottom wall 135 in combination with the first and second sets of one or more openings or through-holes 111 and 89 may define a first damper assembly mounting portion for mounting the input shaft support portion to the first damper assembly at a first mounting location, and a second damper assembly mounting portion for mounting the input shaft support portion to the second damper assembly at a second mounting location.

The input shaft 117 may be mounted proximal to a first end of the input shaft 117. As shown in FIG. 3, the actuator mounting portion 113 may be configured to support the actuator and align an output shaft (hidden from view in FIGS. 3 and 4) of the actuator 57 with the input shaft 117 so that the output shaft of the motor also rotates about the first axis 105. The input shaft 117 may be directly mounted to an output shaft of the actuator 57 via any known method. Some examples of know methods may include a male/female coupling, a collar connecting input shaft to the input shaft 117, a coupling joint such as a universal joint or constant velocity joint, a flexible damper, to name a few non-limiting examples. It is noted that while FIG. 3 the output shaft of actuator 57 is aligned with and directly connected to the input shaft 117, the scope of the current disclosure could include other configurations. For example, the actuator 57 may be mounted so that the output shaft does not align with the input shaft 117. In such a case, any know connection that allows for off-axis transmission of rotational force may be used; some non-limiting examples of which include a universal joint or constant velocity joint. In addition, a gear train, chain, or belt drive may be used to allow for an offset and/or a reduction or overdrive between output shaft of the actuator 57 and the input shaft 117.

The input shaft 117 may have the first output lever 121 and the second output lever 123 adjustably mounted thereto. For example, the first output lever 121 may be have an opening dimensioned to receive the input shaft 117 so that the output lever is movable in a first direction (e.g., direction 53) and/or a second direction (e.g., direction 54) along the input shaft 117. In addition, the interface between the input shaft 117 and the first output lever 121 may be an anti-rotation interface configured to prevent the first output lever 121 from rotating with relation to the input shaft 117. In one example, of an anti-rotation interface, the input shaft 117 may have a keyed portion 125, which may for example be a protrusion. The first output lever 121 may have a first key receiving portion 128 (FIG. 4), which may be dimensioned to slideably receive the keyed portion 125 of input shaft 117, thus allowing the first output lever to be moved in a first direction 53 or second direction 54 along the input shaft while preventing rotation of the first output lever 121 with relation to the input shaft 117. The aforementioned structure is not intended to be limited and may be substituted with any known structure that would prevent the first output lever 121 from rotating with relation to the input shaft 117 while allowing the first output lever to slide along the input shaft 117 allowing for adjustment of the position thereof. For example, the first output lever 121 may include a keyed portion and the input shaft 117 may include a key receiving portion. In another example, the first output lever 121 may include a splined portion configured to slideably engage with a corresponding splined portion of the input shaft 117.

The second output lever 123 may similarly include a second key receiving portion 132 (FIG. 3), which may be dimensioned to slideably receive the keyed portion 125 of input shaft 117, thus allowing the first output lever to be moved in a first direction 53 or second direction 54 along the input shaft while preventing rotation of the second output lever 123 with relation to the input shaft 117. As mentioned above, the aforementioned structure is not intended to be limited and may be substituted with or used in conjunction with any known structure that would prevent the first output lever 121 from rotating with relation to the input shaft 11, which may include but is not limited to the examples described above with respect to the first output lever 121.

Either one of or both of the first output lever 121 and second output lever 123 may further include a corresponding first and second locking feature 127 and 129 configured to lock or fix the location of each of the first output lever 121 and second output lever 123 along axis 105 of the input shaft 117. In one example, either one of or both of the first and second locking features 127 and 129 may for example be a bolt or other threaded fastener and corresponding threaded through hole for receiving each corresponding fastener. With the aforementioned construction, threading each bolt or other threaded fastener in a first direction may result in the bolt or other threaded fastener bottoming out on an outer surface of input shaft 117 thus causing the corresponding first output lever and/or second output lever to be fixed in place and preventing the same from sliding or translation along axis 105 of input shaft 117. Conversely, loosening each bolt or threaded fastener in a second direction may result in the bolt or other fastener separating from the outer surface of the input shaft 117 thus allowing the respective first output lever 121 or second output lever 123 to be slid along the input shaft 117 in directions 53 and/or 54. With the aforementioned example locking features 127 and 129, a technician or user may loosen the fastener corresponding to locking features 127 and/or 129 and adjust the location of corresponding first output lever 121 or second output lever 123 with relation to input shaft 117. Once the first output lever 121 and/or second output lever 123 are in the desired location, the fastener corresponding to locking features 127 and/or 129 may be tightened or rotated in the first direction until the first output lever 121 and/or second output levers 123 are locked in place. The aforementioned features may allow for adjustment of the locations of either one of or both of the first output lever 121 and/or second output lever 123 along the input shaft 117.

FIGS. 3 and 4 show two non-limiting examples of two possible positions of a first output lever 121 and second output lever 123. As mentioned above, either one of or both of the first output lever 121 and second output lever 123 may be movable along axis 105 to allow adjustment to compensate for variations in a distance between first damper assembly frame 59 (FIG. 1) and a second damper assembly frame 61 (e.g., distance H in FIG. 1). Thus, the bracket assembly 100, allows for multiple adjustable outputs from a single input (e.g., actuator 57), while providing adjustment both in the mounting of the bracket 100 and the locations of the adjustable outputs (e.g., first and second output levers 121 and/or 123) so that the bracket assembly can be adjustably connected to the first damper assembly 51 and the second damper assembly 52 when a distance H (FIG. 1) between the first damper assembly 51 and the second damper assembly 52 varies during installation. Accordingly, the aforementioned mounting configuration allows that bracket assembly to adapted to different vent configurations.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A bracket assembly for a heating, ventilation, and air conditioning (HVAC) system, comprising:
- an input shaft extending along and configured to rotate about a first axis in response to an output from an actuator;
- a first output lever configured to transmit a rotational force from the input shaft to a first damper assembly, wherein a first position of the first output lever on the input shaft is adjustable along the first axis;
- a first connection link configured to couple to the first output lever and configured to extend from the first output lever to the first damper assembly, wherein the first connection link is configured to extend cross-wise to the first axis;
- a second output lever configured to transmit the rotational force from the input shaft to a second damper assembly; and
- a second connection link configured to couple to the second output lever and configured to extend from the second output lever to the second damper assembly, wherein the second connection link is configured to extend cross-wise to the first axis.

2. The bracket assembly of claim 1, wherein the first output lever comprises a first locking feature configured to fix the first position of the first output lever on the input shaft along the first axis.

3. The bracket assembly of claim 2, wherein a second position of the second output lever on the input shaft is adjustable along the first axis.

4. The bracket assembly of claim 3, wherein the second output lever comprises a second locking feature configured to fix the second position of the second output lever on the input shaft along the first axis.

5. The bracket assembly of claim 1, wherein a first length of the first connection link is adjustable, and a second length of the second connection link is adjustable.

6. The bracket assembly of claim 1, comprising a housing, wherein the input shaft extends into and through the housing, and the first output lever and the second output lever are disposed within the housing.

7. The bracket assembly of claim 6, wherein the housing comprises:
- a first wall comprising a first bushing, wherein the input shaft extends through the first bushing, and the first bushing is configured to rotatably support the input shaft; and
- a second wall comprising a second bushing, wherein the input shaft extends through the second bushing, the second bushing is configured to rotatably support the input shaft, and the second wall is disposed opposite the first wall.

8. The bracket assembly of claim 6, wherein the housing comprises a wall, and the wall comprises an opening configured to enable access to the first output lever and the second output lever.

9. The bracket assembly of claim 6, wherein the housing comprises a wall configured to mount to the first damper assembly, the second damper assembly, or both.

10. The bracket assembly of claim 9, wherein the wall comprises:
- a first opening configured to receive a first fastener to mount the wall to the first damper assembly; and
- a second opening configured to receive a second fastener to mount the wall to the second damper assembly.

11. The bracket assembly of claim 6, wherein the housing comprises an actuator mounting portion, and the actuator is configured to mount to the housing via the actuator mounting portion.

12. The bracket assembly of claim 1, wherein the input shaft comprises a keyed portion, the first output lever comprises a first key receiving portion configured to slideably receive the keyed portion of the input shaft, the second output lever comprises a second key receiving portion configured to slideably receive the keyed portion of the input shaft, and the first key receiving portion and the second key receiving portion are each configured to engage with the keyed portion to block rotation of the first output lever and the second output lever, respectively, relative to the input shaft.

13. A damper system for a heating, ventilation, and air conditioning (HVAC) system, comprising:
- an actuator configured to output a rotational force;
- an input shaft coupled to the actuator, wherein the input shaft extends along a first axis;
- a first output lever coupled to the input shaft and configured to transmit the rotational force from the input shaft to a first damper assembly, wherein a first position of the first output lever on the input shaft is adjustable along the first axis;
- a first locking feature configured to fix the first position of the first output lever on the input shaft along the first axis; and
- a second output lever configured to transmit the rotational force from the input shaft to a second damper assembly.

14. The damper system of claim 13, comprising:
- the first damper assembly;
- the second damper assembly;
- a first connection link coupled to the first output lever and extending from the first output lever to the first damper assembly, wherein the first connection link extends cross-wise to the first axis; and
- a second connection link coupled to the second output lever and extending from the second output lever to the second damper assembly, wherein the second connection link extends cross-wise to the first axis.

15. The damper system of claim 14, wherein a first length of the first connection link is adjustable, and a second length of the second connection link is adjustable.

16. The damper system of claim 13, wherein the first output lever comprises the first locking feature.

17. The damper system of claim 13, wherein a second position of the second output lever on the input shaft is adjustable along the first axis.

18. The damper system of claim 13, wherein the first output lever and the second output lever are each slideably positioned along the input shaft, and the first output lever and the second output lever are each keyed to the input shaft.

19. A bracket assembly for a heating, ventilation, and air conditioning (HVAC) system, comprising:

an input shaft extending along and configured to rotate about a first axis in response to an output from an actuator;

a first output lever slideably positioned along the input shaft, wherein the first output lever is configured to transmit a rotational force from the input shaft to a first damper assembly, and a first position of the first output lever on the input shaft is adjustable along the first axis;

a first locking feature configured to fix the first position of the first output lever on the input shaft along the first axis;

a second output lever slideably positioned along the input shaft, wherein the second output lever is configured to transmit the rotational force from the input shaft to a second damper assembly, and a second position of the second output lever on the input shaft is adjustable along the first axis; and a second locking feature configured to fix the second position of the second output lever on the input shaft along the first axis.

20. The bracket assembly of claim 19, comprising:

a first connection link configured to couple to the first output lever and configured to extend from the first output lever to the first damper assembly, wherein the first connection link is configured to extend cross-wise to the first axis; and a second connection link configured to couple to the second output lever and configured to extend from the second output lever to the second damper assembly, wherein the second connection link is configured to extend cross-wise to the first axis.

* * * * *